United States Patent
Kim et al.

(10) Patent No.: US 9,419,550 B2
(45) Date of Patent: Aug. 16, 2016

(54) METHODS AND APPARATUSES FOR CONTROLLING TORQUES OF PERMANENT MAGNET SYNCHRONOUS MOTORS

(71) Applicant: Samsung Electronics Co., Ltd., Suwon-Si, Gyeonggi-Do (KR)

(72) Inventors: Hyun-bae Kim, Yongin-si (KR); Jung-hyo Lee, Suwon-si (KR); Jei-hoon Baek, Seoul (KR); Kyu-bum Han, Hwaseong-si (KR)

(73) Assignees: Samsung Electronics Co., Ltd., Gyeonggi-Do (KR); Sungkyunkwan University Foundation For Corporate Collaboration, Gyeonggi-Do (KR)

( * ) Notice: Subject to any disclaimer, the term of this patent is extended or adjusted under 35 U.S.C. 154(b) by 92 days.

(21) Appl. No.: 14/309,162

(22) Filed: Jun. 19, 2014

(65) Prior Publication Data

US 2014/0375236 A1  Dec. 25, 2014

(30) Foreign Application Priority Data

Jun. 24, 2013  (KR) .................. 10-2013-0072715

(51) Int. Cl.
*H02P 6/06* (2006.01)
*H02P 6/08* (2016.01)
*H02P 21/06* (2016.01)

(52) U.S. Cl.
CPC . *H02P 6/08* (2013.01); *H02P 21/06* (2013.01)

(58) Field of Classification Search
USPC .......... 318/400.04, 400.07, 400.15, 431, 432, 318/434
See application file for complete search history.

(56) References Cited

U.S. PATENT DOCUMENTS

| | | | |
|---|---|---|---|
| 7,923,953 B2 | 4/2011 | Gallegos-Lopez et al. | |
| 8,253,357 B2* | 8/2012 | Bailey | B60L 11/123 318/140 |
| 2006/0055363 A1 | 3/2006 | Patel et al. | |
| 2011/0241578 A1* | 10/2011 | Kim | H02P 21/14 318/400.02 |
| 2014/0070741 A1* | 3/2014 | Luedtke | B60L 15/20 318/400.15 |

FOREIGN PATENT DOCUMENTS

| | | |
|---|---|---|
| KR | 20090045771 A | 5/2009 |
| KR | 20120066520 A | 6/2012 |

* cited by examiner

*Primary Examiner* — Eduardo Colon Santana
*Assistant Examiner* — Iftekhar Mustafa
(74) *Attorney, Agent, or Firm* — Harness, Dickey & Pierce, P.L.C.

(57) ABSTRACT

A method of controlling torque of a permanent magnet synchronous motor (PMSM) by using a speed-torque lookup table may include: receiving a current direct-current (DC) link voltage of an inverter configured to drive the PMSM and a speed of a rotor of the PMSM; calculating a change ratio of a DC link voltage based on the current DC link voltage and a DC link voltage at a time when the speed-torque lookup table is generated; calculating a normalized speed of the rotor according to a change in the DC link voltage by using the speed of the rotor and the change ratio of the DC link voltage; and/or transferring the normalized speed of the rotor as an input to the speed-torque lookup table.

14 Claims, 4 Drawing Sheets

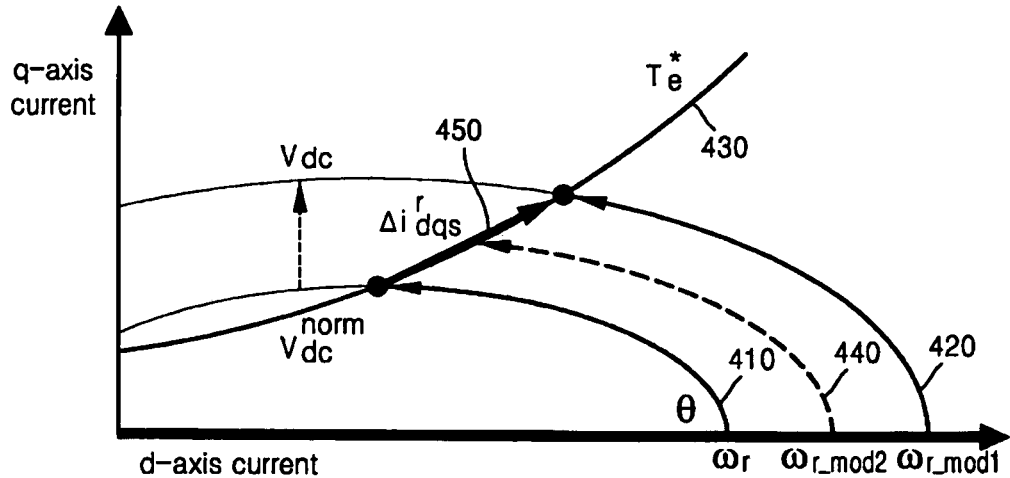
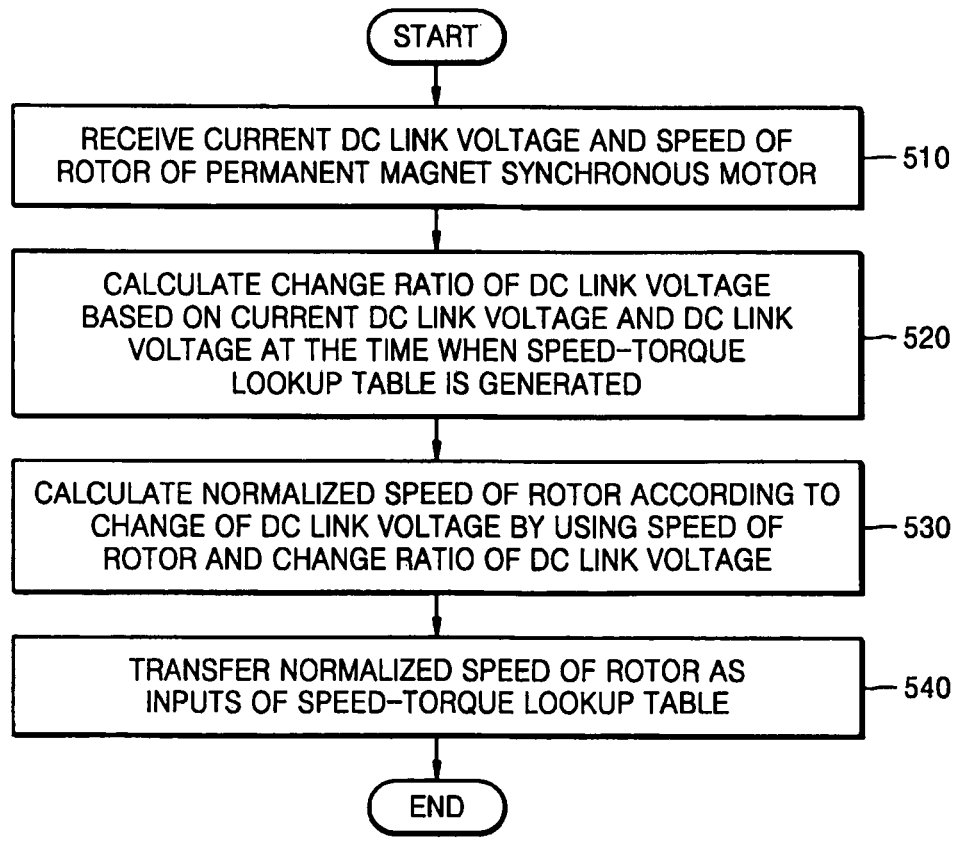

METHODS AND APPARATUSES FOR CONTROLLING TORQUES OF PERMANENT MAGNET SYNCHRONOUS MOTORS

CROSS-REFERENCE TO RELATED APPLICATION(S)

This application claims priority from Korean Patent Application No. 10-2013-0072715, filed on Jun. 24, 2013, in the Korean Intellectual Property Office (KIPO), the entire contents of which are incorporated herein by reference.

BACKGROUND

1. Field

Some example embodiments may relate generally to methods and/or apparatuses for controlling torques of permanent magnet synchronous motors (PMSM) by using speed-torque lookup tables.

2. Description of Related Art

Permanent magnet synchronous motors (PMSMs) are widely used in various fields, such as electric vehicles, industrial equipment, and consumer electronics, due to their advantages of high efficiency and durability. With the development of various control techniques, performance of a PMSM has been improved and thus high-speed operation of the PMSM is made possible. During operation of a PMSM, control of the PMSM may become unstable due to a change in the speed of the PMSM, a change in the surrounding temperature, a change in a direct link voltage of an inverter, and a change in parameters such as a voltage, current, and a frequency of the PMSM. Thus, a control method of the PMSM that may stably transfer a torque to a load regardless of changes in the speed of the PMSM, the surrounding temperature, the direct current link voltage of the inverter, or the parameters of the PMSM during the operation of the PMSM is required.

SUMMARY

Some example embodiments may provide methods and/or apparatuses for controlling torques of permanent magnet synchronous motors (PMSMs) by using speed-torque lookup tables.

Some example embodiments may provide computer readable recording mediums having embodied thereon a program for executing the methods.

In some example embodiments, a method of controlling torque of a permanent magnet synchronous motor (PMSM) by using a speed-torque lookup table may comprise: receiving a current direct-current (DC) link voltage of an inverter configured to drive the PMSM and a speed of a rotor of the PMSM; calculating a change ratio of a DC link voltage based on the current DC link voltage and a DC link voltage at a time when the speed-torque lookup table is generated; calculating a normalized speed of the rotor according to a change in the DC link voltage by using the speed of the rotor and the change ratio of the DC link voltage; and/or transferring the normalized speed of the rotor as an input to the speed-torque lookup table.

In some example embodiments, the method may further comprise: adjusting the change ratio of the DC link voltage according to a change in parameters of the PMSM. The calculating the normalized speed of the rotor may comprise calculating the normalized speed of the rotor based on the adjusted change ratio of the DC link voltage.

In some example embodiments, the adjusting the change ratio of the DC link voltage may comprise adjusting the change ratio of the DC link voltage based on a command voltage of a current controller configured to control a current applied to the PMSM and a maximum inverter output voltage.

In some example embodiments, the adjusting the change ratio of the DC link voltage may comprise, when a voltage limiting circle of an inverter output voltage becomes smaller than the command voltage of the current controller configured to control the current applied to the PMSM, due to the change in the parameters of the PMSM, adjusting the change ratio of the DC link voltage based on the voltage limiting circle.

In some example embodiments, the adjusting the change ratio of the DC link voltage may comprise: calculating a change ratio control value that limits the change ratio of the DC link voltage according to the change in the parameters of the PMSM; and/or adjusting the change ratio of the DC link voltage based on the calculated change ratio control value.

In some example embodiments, the calculating the change ratio control value may comprise: receiving a command voltage of a current controller, wherein the change in the parameters of the PMSM is reflected in the command voltage; calculating an amount of the command voltage; calculating a maximum inverter output voltage based on the current DC link voltage; calculating an error between the maximum inverter output voltage and the amount of the command voltage; and/or calculating the change ratio control value based on the error.

In some example embodiments, the calculating the change ratio control value may comprise calculating the change ratio control value such that the error is compensated for by using a proportional integral (PI) controller.

In some example embodiments, the method may further comprise: adjusting the change ratio control value such that the change ratio of the DC link voltage is limited only when a voltage limiting circle of an inverter output voltage is smaller than the command voltage of the current controller. The adjusting the change ratio of the DC link voltage may comprise adjusting the change ratio of the DC link voltage based on the adjusted change ratio control value.

In some example embodiments, the calculating the maximum inverter output voltage may comprise calculating the maximum inverter output voltage based on a maximum linear modulation range according to a space vector pulse width modulation (PWM) method of an inverter output voltage.

In some example embodiments, a computer readable recording medium may have embodied thereon a program for executing the method of controlling torque of a permanent magnet synchronous motor (PMSM) by using a speed-torque lookup table.

In some example embodiments, a controlling apparatus for controlling torque of a permanent magnet synchronous motor (PMSM), the controlling apparatus may comprise: a speed normalization unit configured to normalize a speed of a rotor of the PMSM according to a change in a direct-current (DC) link voltage, based on an input current DC link voltage and a DC link voltage at a time when a speed-torque lookup table is generated, and to output the normalized speed of the rotor; a command current obtaining unit configured to obtain a command current corresponding to the normalized speed of the rotor and a command torque by using the speed-torque lookup table; a current controller configured to generate a command voltage based on the command current, a current detected in the PMSM, and the speed of the rotor; and/or a pulse width modulation (PWM) control unit configured to determine an on/off duty ratio of a control pulse signal that controls an inverter output voltage based on the command voltage.

In some example embodiments, the speed normalization unit may comprise: a change ratio calculation unit configured to calculate a change ratio of DC link voltage based on the current DC link voltage and the DC link voltage at the time when the speed-torque lookup table is generated; and/or a speed calculation unit configured to calculate the normalized speed of the rotor by using the speed of the rotor and the change ratio of the DC link voltage.

In some example embodiments, the speed normalization unit may further comprise a change ratio control unit configured to output a change ratio control value that limits the change ratio of the DC link voltage according to a change in parameters of the PMSM. The speed calculation unit may be further configured to adjust the change ratio of the DC link voltage based on the change ratio control value. The speed calculation unit may be further configured to calculate the normalized speed of the rotor based on the adjusted change ratio of the DC link voltage.

In some example embodiments, the change ratio control unit may be further configured to output the change ratio control value such that the change ratio of the DC link voltage is limited only when a voltage limit circle of the inverter output voltage becomes smaller than the command voltage of the current controller due to the change in the parameters of the PMSM.

In some example embodiments, the change ratio control unit may further comprise: a calculation unit configured to calculate an amount of the command voltage in which the change in the parameters of the PMSM is reflected, configured to calculate a maximum inverter output voltage based on the current DC link voltage, and configured to calculate an error between the maximum inverter output voltage and the amount of the command voltage; and/or a limiter configured to adjust the change ratio control value to limit the change ratio of the DC link voltage only when a voltage limiting circle of the inverter output voltage is smaller than the amount of the command voltage. The speed calculation unit may be further configured to adjust the change ratio of the DC link voltage based on the adjusted change ratio control value.

In some example embodiments, the calculation unit may be further configured to calculate the maximum inverter output voltage based on a maximum linear modulation range according to a space vector PWM method of the inverter output voltage.

In some example embodiments, the controlling apparatus may be configured to generate the control pulse signal by using the normalized speed of the rotor in which the change of the DC link voltage and a change in parameters of the PMSM are reflected. The controlling apparatus may be configured to output the control pulse signal to an inverter to control torque of the PMSM.

BRIEF DESCRIPTION OF THE DRAWINGS

The above and/or other aspects and advantages will become more apparent and more readily appreciated from the following detailed description of example embodiments, taken in conjunction with the accompanying drawings, in which:

FIG. 4 is a graph showing a variation in a dq-axis current of a permanent magnet synchronous motor (PMSM) according to a change in a direct current (DC) link voltage of a permanent magnet synchronous motor; and FIG. 5 is a flowchart illustrating a method of controlling torque of a PMSM by using a speed-torque lookup table according to some example embodiments.

DETAILED DESCRIPTION

Figure 1:
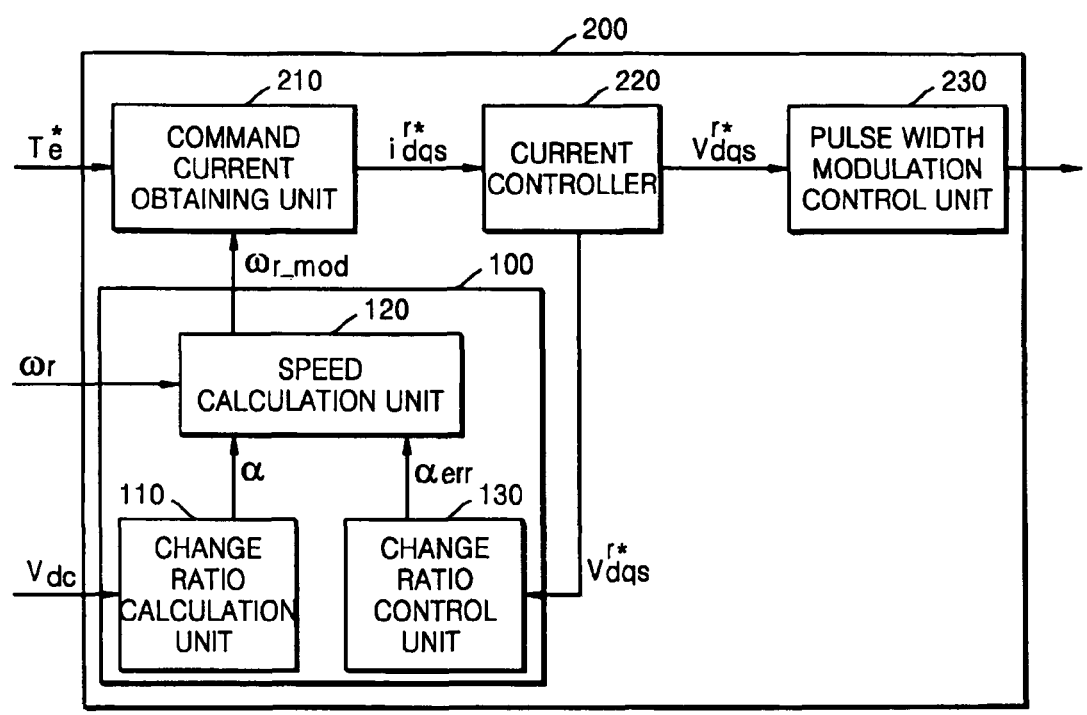
FIG. 1 is a block diagram illustrating a controlling apparatus according to some example embodiments.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will typically have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature, their shapes are not intended to illustrate the actual shape of a region of a device, and their shapes are not intended to limit the scope of the example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is a block diagram illustrating a controlling apparatus 200 according to some example embodiments. Referring to FIG. 1, the controlling apparatus 200 includes a speed normalization unit 100, a command current obtaining unit 210, a current controller 220, and a pulse width modulation control unit 230. The speed normalization unit 100 includes a change ratio calculation unit 110 and a speed calculation unit 120, and may further include a change ratio control unit 130.

Those of ordinary skill in the art may easily understand that the controlling apparatus 200 may further include general constituent elements other than the constituent elements illustrated in FIG. 1.

The controlling apparatus 200 according to some example embodiments may correspond to at least one processor or may include at least one processor. Accordingly, the controlling apparatus 200 may be included in other hardware equipment such as a microprocessor or a general computer system to be driven therein.

The controlling apparatus 200 of FIG. 1 controls torque of a permanent magnet synchronous motor (PMSM) by using a speed-torque lookup table.

A PMSM generates a magnetic flux by using a permanent magnet located at a rotor (not shown) of the PMSM and is rotated as current flows in a stator due to the generated magnetic flux. The PMSM according to some example embodiments may be an interior PMSM (IPMSM), but example embodiments are not limited thereto.

The controlling apparatus 200 outputs a control pulse signal to an inverter (not shown) that drives the PMSM according to an input command torque, and the inverter supplies an inverter output voltage generated according to the control pulse signal to the PMSM. The command torque may be a value input by a user to control an operation of the PMSM or a preset value set by the controlling apparatus 200.

To conduct a precise torque control of the PMSM, the controlling apparatus 200 generates a control pulse signal for controlling the inverter not only based on the input command torque but also on a current detected in the PMSM, a speed of a rotor, and a direct current (DC) link voltage of the inverter.

The speed-torque lookup table stores command current values corresponding to speeds of rotors and torque values of command torques of the PMSM. The speed-torque lookup table may store command current values obtained by calculation or command current values that are obtained by experiments. Accordingly, the controlling apparatus 200 outputs a command current value corresponding to an input rotor speed and an input command torque by referring to the speed-torque lookup table.

The speed normalization unit 100 normalizes the speed of the rotor of the PMSM according to a change in the DC link voltage to output a normalized speed of the rotor. The DC link voltage is not a fixed value but a value that is variable according to the speed of the rotor of the PMSM.

However, the speed-torque lookup table is generated based on a single DC link voltage and does not reflect a change in the DC link voltage according to the speed of the rotor. Thus, the speed normalization unit 100 normalizes the speed of the rotor according to a change in the DC link voltage in order to reflect a change in the DC link voltage in torque control by using the speed-torque lookup table, and transfers the normalized speed of the rotor as an input of the speed-torque lookup table.

This normalization of the speed of the rotor refers to adjusting the speed of the rotor to be appropriate according to a change in the DC link voltage. That is, torque control of the PMSM may be conducted in consideration of the change in the DC link voltage by applying the speed of the rotor that is adjusted according to the change in the DC link voltage to the speed-torque lookup table.

The speed normalization unit 100 normalizes the speed of the rotor according to the change in the DC link voltage based on a current DC link voltage and a DC link voltage at the time when the speed-torque lookup table is generated. For example, the speed normalization unit 100 may calculate a change ratio of the DC link voltage based on the current DC link voltage and the DC link voltage at the time when the speed-torque lookup table is generated, and may normalize the speed of the rotor by using the change ratio of the DC link voltage.

According to some example embodiments, the speed normalization unit 100 includes the change ratio calculation unit 110 and the speed calculation unit 120. The change ratio calculation unit 110 calculates a change ratio of a DC link voltage based on a current DC link voltage and a DC link voltage at the time when the speed-torque lookup table is generated. The speed calculation unit 120 calculates the normalized speed of the rotor by using the speed of the rotor and the calculated change ratio of the DC link voltage.

According to some example embodiments, the speed normalization unit 100 may further include the change ratio control unit 130 that calculates the normalized speed of the rotor by further considering the change in parameters, in addition to the change ratio calculation unit 110 and the speed calculation unit 120. The parameters of the PMSM indicate inductances of the PMSM and magnetic flux interlinkage of a permanent magnet.

According to some example embodiments, the change ratio control unit 130 outputs a change ratio control value that limits the change ratio of the DC link voltage according to the change in parameters of the PMSM. The speed calculation unit 120 adjusts the change ratio of the DC link voltage based on the change ratio control value, and calculates the normalized speed of the rotor based on the adjusted change ratio of the DC link voltage.

Consequently, by conducting torque control of the PMSM by using the speed-torque lookup table in consideration of a change in the DC link voltage and parameters of the PMSM, precision of the torque control may be further increased.

The command current obtaining unit 210 obtains a command torque that is input by using the speed-torque lookup table and a command torque corresponding to the normalized speed of the rotor obtained by using the speed normalization unit 100. A lookup table (LUT) is a data structure in which result values corresponding to input values are listed as an array or an associative array. The lookup table may include values obtained by calculation or values obtained by experiments as the result values.

The speed-torque lookup table may store command current values obtained by calculation or experiments with the speed of the rotor of the PMSM and the torque values of the command torque. Accordingly, the command current obtaining unit 210 may output a command current corresponding to the normalized speed of the rotor and the command torque input to the command current obtaining unit 210 by referring to the speed-torque lookup table.

The current controller 220 generates a command voltage based on the command current received from the command current obtaining unit 210, a current detected in the PMSM, and the speed of the rotor. The command voltage is a target PMSM voltage of the controlling apparatus 200, and corresponds to an output voltage that is to be output from an inverter. The current controller 220 controls a desired current to flow in the PMSM, compensates for an error between the command current and the current detected in the PMSM, and generates a command voltage having the compensated error between an actual current flowing through the PMSM and the command current. The current controller 220 outputs the generated command voltage to the pulse width modulation control unit 230.

The pulse width modulation control unit 230 determines an on/off duty ratio of a control pulse signal that controls an inverter output voltage based on the command voltage. The pulse width modulation control unit 230 generates a control pulse signal that controls a switching device of the inverter so as to generate an inverter output voltage according to a command voltage, which is used by the inverter in compensating for the error between the command current and the actual current flowing in the PMSM. The control pulse signal is also referred to as a gating signal. According to some example embodiments, the pulse width modulation control unit 230 may use a spatial vector voltage modulation method from among various pulse width modulation controlling methods according to a voltage modulation method.

The pulse width modulation control unit 230 outputs to an inverter a control pulse signal having an on/off duty ratio determined based on the command voltage. As switching devices in the inverter are switched according to a determined on/off duty ratio, the inverter supplies the inverter output voltage generated according to the control pulse signal, to the PMSM.

Figure 2:
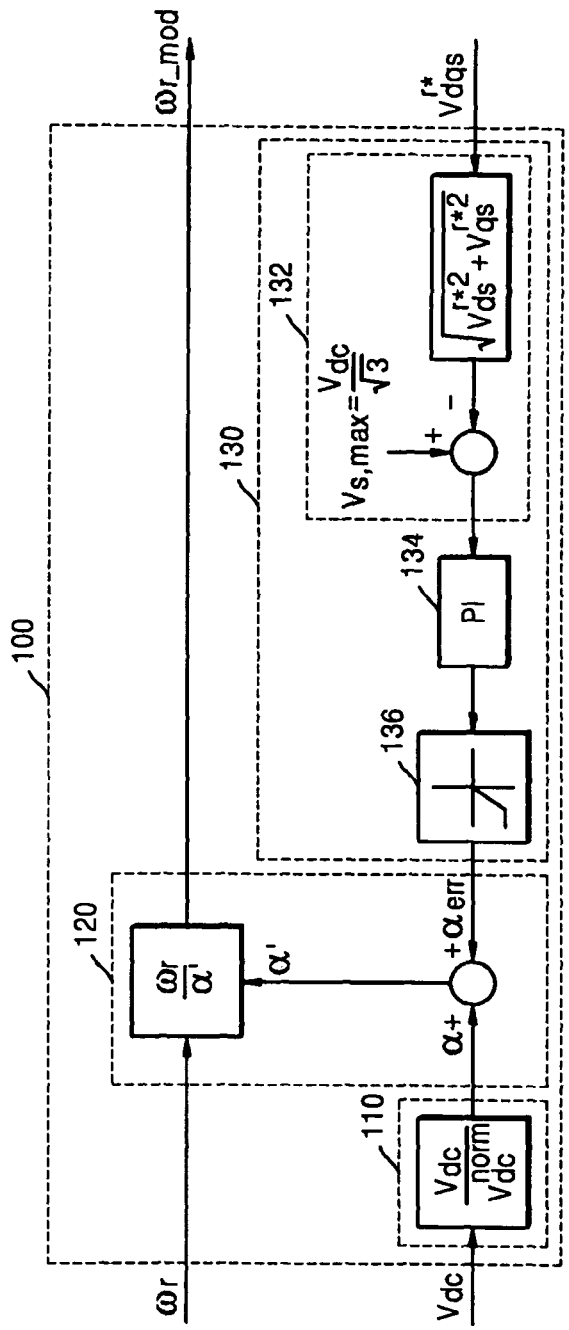
FIG. 2 illustrates a speed normalization unit illustrated in FIG. 1 according to some example embodiments.

FIG. 2 illustrates the speed normalization unit 100 illustrated in FIG. 1. Referring to FIG. 2, the speed normalization unit 100 includes the change ratio calculation unit 110, the speed calculation unit 120, and the change ratio control unit 130. The change ratio control unit 130 may include a calculation unit 132, a proportional integral (PI) controller 134, and a limiter 136.

The speed normalization unit 100 of FIG. 2 may further include general constituents other than the constituents illustrated in FIG. 2. Descriptions related to the speed normalization unit 100 of FIG. 1 may also be applied to the speed normalization unit 100 illustrated in FIG. 2, and thus, relevant repeating descriptions are omitted.

The speed normalization unit 100 according to some example embodiments may correspond to at least one processor or may include at least one processor. Accordingly, the speed normalization unit 100 may be included in other hardware equipment such as a controlling apparatus or a general computer system to be driven therein.

The speed normalization unit 100 normalizes a speed $\omega_r$ of a rotor of a PMSM according to a change in a DC link voltage based on a current, input DC link voltage $V_{dc}$ and a DC link voltage $V_{dc}^{norm}$ at the time when a speed-torque lookup table is generated, thereby outputting a normalized speed $\omega_{r\_mod}$ of the rotor.

The change ratio calculation unit 110 calculates a change ratio $\alpha$ of the DC link voltage based on the current DC link voltage $V_{dc}$ and the DC link voltage $V_{dc}^{norm}$ at the time when the speed-torque lookup table is generated. The change ratio $\alpha$ of the DC link voltage may be calculated by Equation as below.

$$\alpha = \frac{V_{dc}}{V_{dc}^{norm}} \quad \text{[Equation 1]}$$

In Equation 1, $V_{dc}$ denotes the current DC link voltage, and $V_{dc}^{norm}$ denotes a DC link voltage at the time when the speed-torque lookup table is generated. That is, the change ratio $\alpha$ of the DC link voltage may be expressed by a value obtained by dividing the current DC link voltage $V_{dc}$ by the DC link voltage $V_{dc}^{norm}$ at the time when the speed-torque lookup table is generated.

The change ratio control unit 130 outputs a change ratio control value $\alpha_{err}$ that limits the change ratio $\alpha$ of the DC link voltage according to a change in parameters in the PMSM. The change ratio control unit 130 may output the change ratio control value $\alpha_{err}$ such that the change ratio $\alpha$ of the DC link voltage is limited only when a voltage limit circle of the inverter output voltage is smaller than the command voltage $v_{dqs}^{r*}$ of the current controller 220 due to the change in parameters of the PMSM.

According to some example embodiments, the change ratio control unit 130 may include the calculation unit 132, the PI controller 134, and the limiter 136.

The calculation unit 132 calculates an error between a maximum inverter output voltage $V_{s,max}$ and a command voltage $v_{dqs}^{r*}$.

An amount $|v_{dqs}^{r*}|$ of the command voltage is a value in which a change in parameters of the PMSM is reflected, and the calculation unit 132 may calculate an amount $|v_{dqs}^{r*}|$ of the command voltage by using Equation 2 below.

$$|v_{dqs}^{r*}| = \sqrt{v_{ds}^{r*2} + v_{qs}^{r*2}}, \text{[Equation 2]}$$

where $|v_{dqs}^{r*}|$ denotes an amount of the command voltage $v_{dqs}^{r*}$, $v_{ds}^{r*}$ denotes a d-axis command voltage, and $v_{qs}^{r*}$ denotes a q-axis command voltage.

Also, the calculation unit 132 may calculate the maximum inverter output voltage $V_{s,max}$ based on the current DC link voltage $V_{dc}$. For example, the maximum inverter output voltage $V_{s,max}$ be a maximum linear modulation range according to a space vector pulse width modulation (PWM) method of the inverter output voltage. The maximum linear modulation range according to the space vector PWM method may be calculated by Equation 3 below.

$$V_{s,max} = \frac{V_{dc}}{\sqrt{3}} \qquad \text{[Equation 3]}$$

In Equation 3, $V_{s,max}$ denotes a maximum linear modulation range according to the space vector PWM method, and the maximum linear modulation range according to the space vector PWM method may be obtained by dividing the current DC link voltage $V_{dc}$ by $\sqrt{3}$.

However, the maximum inverter output voltage $V_{s,max}$ is not limited to the maximum linear modulation range according to the space vector PWM method. The maximum inverter output voltage $V_{s,max}$ may also denote a maximum output voltage which may be generated by an inverter according to a position of a rotor besides the maximum linear modulation range according to the space vector PWM method, and may be obtained by using other various methods than by Equation 3.

The PI controller 134 outputs a change ratio control value $\alpha_{err}$ that compensates for an error between the maximum inverter output voltage $V_{s,max}$ and the command voltage $v_{dqs}^{r*}$.

The PI controller 134 is in the form of a feedback controller, and calculates a control value needed for controlling, based on an error between an object value to be controller and a basis reference value by using a proportional term and an integral term. That is, an amount of the command voltage $v_{dqs}^{r*}$ an object value to be controlled, and the maximum inverter output voltage $V_{s,max}$ is a reference value which acts as a basis. The PI controller 134 outputs the change ratio control value $\alpha_{err}$ such that the error becomes 0 based on the maximum inverter output voltage $V_{s,max}$ and the amount of the command voltage $v_{dqs}^{r*}$.

The limiter 136 adjusts the change ratio control value $\alpha_{err}$ such that the change ratio control value $\alpha_{err}$ limits the change ratio of the DC link voltage only when a voltage limiting circle of the inverter output voltage is smaller than the command voltage.

The change ratio control unit 130 outputs the change ratio control value $\alpha_{err}$ only when the voltage limiting circle of the inverter output voltage according to the current DC link voltage becomes smaller than the amount of the command voltage due to a change in parameters of the PMSM, and reduces a DC link voltage change ratio $\alpha$ to an appropriate value. The parameters of the PMSM denote inductances of the PMSM and magnetic flux interlinkage of a permanent magnet.

When an error between a maximum inverter output voltage $V_{s,max}$ and a command voltage $v_{dqs}^{r*}$ becomes a negative number, a voltage limiting circle of the inverter output voltage becomes smaller than the command voltage $v_{dqs}^{r*}$. That is, the limiter 136 outputs a change ratio control value $\alpha_{err}$ only when the error between the maximum inverter output voltage $V_{s,max}$ and the command voltage $v_{dqs}^{r*}$ becomes a negative number, and when the error between the maximum inverter output voltage $V_{s,max}$ and the command voltage $v_{dqs}^{r*}$ is a positive number, the limiter 136 outputs 0 not the change ratio control value $\alpha_{err}$.

Also, when the error between the maximum inverter output voltage $V_{s,max}$ the command voltage $v_{dqs}^{r*}$ a negative number, the limiter 136 sets a limit of the change ratio control value $\alpha_{err}$ a to prevent the change ratio control value $\alpha_{err}$ from being output at a desired value (that may or may not be predetermined) or higher due to abnormality in the PI controller 134.

The speed calculation unit 120 adjusts a change ratio $\alpha$ of a DC link voltage based on the change ratio control value $\alpha_{err}$ and normalizes a speed $\omega_r$ of a rotor based on the adjusted change ratio $\alpha'$ of the DC link voltage. The adjusted change ratio $\alpha'$ of the DC link voltage may be calculated as in Equation 4 below.

$$\alpha' = \alpha + \alpha_{err} \qquad \text{[Equation 4]}$$

In Equation 4, the adjusted change ratio $\alpha'$ of the DC link voltage may be calculated by adding the change ratio control value $\alpha_{err}$ to the change ratio $\alpha$ of the DC link voltage. The change ratio control value $\alpha_{err}$ is a negative number, and the change ratio $\alpha$ of the DC link voltage is reduced by the change ratio control value $\alpha_{err}$ due to the change in parameters of the PMSM.

The speed calculation unit 120 normalizes the speed $\omega_r$ of the rotor, and transfers the normalized speed $\omega_{r\_mod}$ of the rotor as inputs of a speed-torque lookup table. The speed calculation unit 120 may calculate the normalized speed $\omega_{r\_mod}$ of the rotor by using Equation 5 below.

$$\omega_{r\_mod} = \frac{\omega_r}{\alpha'} \qquad \text{[Equation 5]}$$

In Equation 5, the normalized speed $\omega_{r\_mod}$ of the rotor refers to a value obtained by dividing the speed $\omega_r$ of the rotor by the adjusted change ratio $\alpha'$ of the DC link voltage.

The speed normalization unit 100 transfers the calculated, normalized speed $\omega_{r\_mod}$ of the rotor as inputs of the speed-torque lookup table to reflect the change in the DC link voltage and the change of the parameters to generate a control pulse signal, and outputs the control pulse signal to the inverter, thereby controlling torque of the PMSM.

Accordingly, voltage in regard to torque control of the PMSM by using the speed-torque lookup table, the controlling apparatus 200 may conduct precise torque control by reflecting a change in a DC link voltage by simple calculation whereby the speed input to the speed-torque lookup table according is corrected according to the change in a current DC link voltage.

Figure 3:
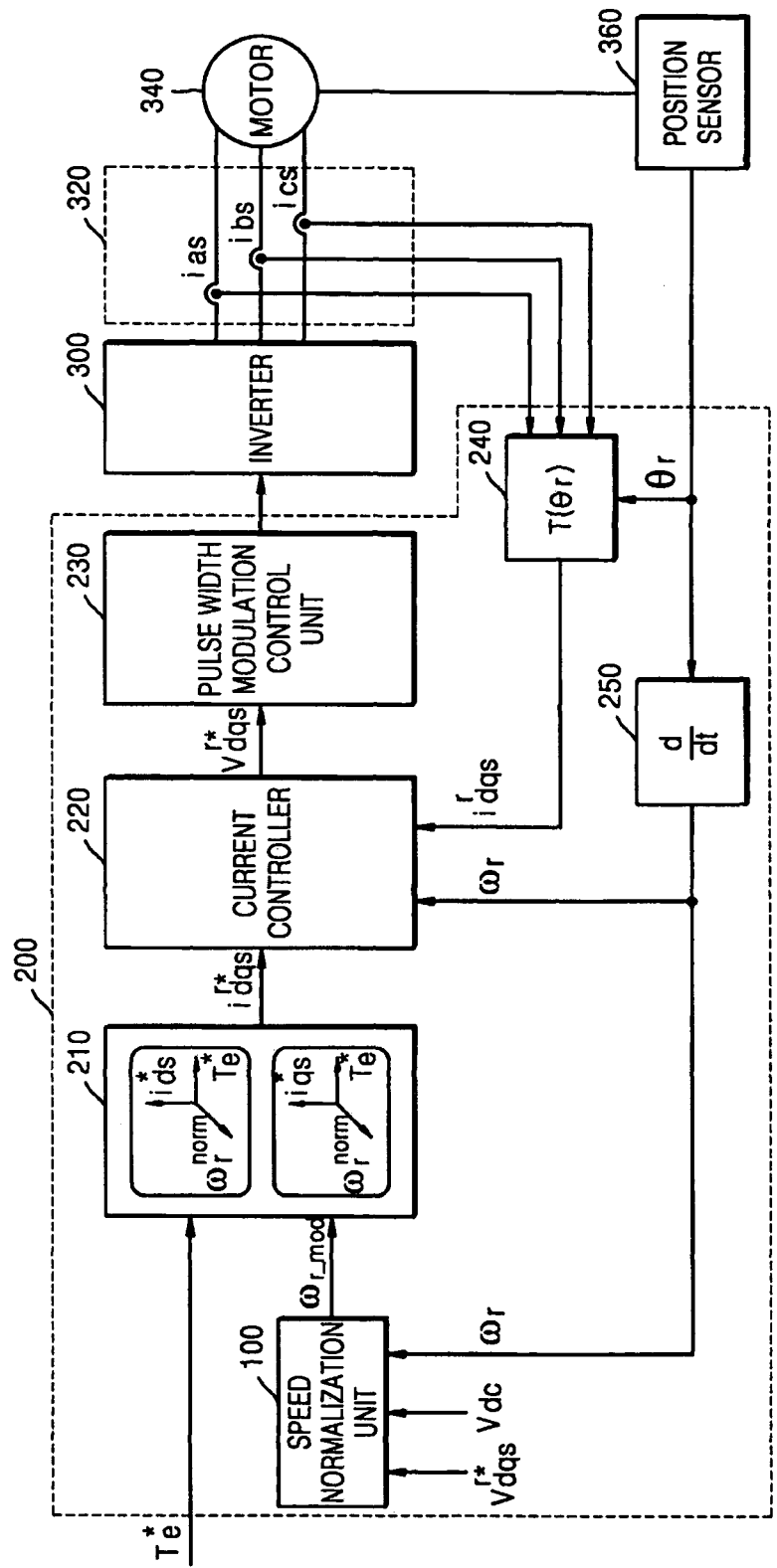
FIG. 3 is a block diagram illustrating a control system including a controlling apparatus according to some example embodiments.

FIG. 3 is a block diagram illustrating a control system including a controlling apparatus, according to some example embodiments. The control system illustrated in FIG. 3 includes a controlling apparatus 200, an inverter 300, a current detector 320, a PMSM 340, and a position sensor 360. Also, the controlling apparatus 200 includes a speed normalization unit 100, a command current obtaining unit 210, a current controller 220, a pulse width modulation control unit 230, a coordinates converting unit 240, and a speed calculation unit 250.

Those of ordinary skill in the art may easily understand that the control system may further include general constituent elements other than the constituent elements illustrated in FIG. 3.

Descriptions related to the controlling apparatus 200 and the speed normalization unit 100 of FIGS. 1 and 2 may also be applied to the controlling apparatus 200 and the speed normalization unit 100 illustrated in FIG. 3, and thus, relevant repeating descriptions are omitted.

The controlling apparatus 200 outputs a control pulse signal to the inverter 300 that drives the PMSM 340 according to an input command torque, thereby controlling torque of the PMSM 340.

Torque control of the PMSM 340 may be performed by using a vector control method. Three-phase variables denoted as a, b, and c of the PMSM 340 may be converted to a dq-axis model which is a rectangular coordinate system and displayed.

To precisely control torque of the PMSM 340, the controlling apparatus 200 according to some example embodiments generates a control pulse signal that controls the inverter 300 based on not only an input command torque but also a current detected in the PMSM 340, a speed of a rotor, a change in a DC link voltage of the inverter, and a change in parameters of the PMSM 340.

The controlling apparatus 200 according to some example embodiments includes a speed normalization unit 100, a command current obtaining unit 210, a current controller 220, a pulse width modulation control unit 230, a coordinates converting unit 240, and a speed calculation unit 250.

The speed normalization unit 100 normalizes a speed $\omega_r$ of a rotor of the PMSM 340 based on an input, current DC link voltage $V_{dc}$ and a DC link voltage $V_{dc}^{norm}$ at the time when the speed-torque lookup table is generated, according to the change in the DC link voltage and the change in the parameters of the PMSM 340, thereby outputting the normalized speed $\omega_{r\_mod}$ of the rotor to the command current obtaining unit 210.

The command current obtaining unit 210 may obtain the command current $i_{dqs}^{r*}$ corresponding to the normalized speed $\omega_{r\_mod}$ of the rotor and the input command torque $T_e^*$ using the speed-torque lookup table. The command current obtaining unit 210 outputs the obtained command current $i_{dqs}^{r*}$ to the current controller 220.

The current controller 220 generates a command voltage $v_{dqs}^{r*}$ based on the command current $i_{dqs}^{r*}$, the current $i_{dqs}^{r}$ detected in the PMSM 340, and a speed $\omega_r$ of the rotor. The current controller 220 controls a desired current to flow through the PMSM 340, and compensates for an error between the command current $i_{dqs}^{r*}$ and the current $i_{dqs}^{r*}$ detected in the PMSM 340. The current controller 220 outputs the generated command voltage $v_{dqs}^{r*}$ to the pulse width modulation control unit 230.

The pulse width modulation control unit 230 determines an on/off duty ratio of a control pulse signal that controls an inverter output voltage based on the command voltage $v_{dqs}^{r*}$. The pulse width modulation control unit 230 generates a control pulse signal that controls a switching device of the inverter 300 based on the determined on/off duty ratio. The pulse width modulation control unit 230 outputs the generated control pulse signal to the inverter 300. Accordingly, the inverter 300 may generate an inverter output voltage according to the command voltage $v_{dqs}^{r*}$ based on the received control pulse signal.

The coordinates converting unit 240 converts coordinates of the three-phase currents $i_{as}$, $i_{bs}$, and $i_{cs}$ detected in the current detector 320 to display the same as a dq-axis model, and outputs a rotary coordinate system current $i_{dqs}^{r}$ whose coordinates are converted to a dq-axis model, to the current controller 220.

The speed calculation unit 250 estimates the speed $\omega_r$ of the rotor based on the input position $\theta_r$ of the rotor.

The inverter 300 converts input power according to the on/off duty ratio of the control pulse signal applied by the controlling apparatus 200 to generate an output voltage applied to the PMSM 340. The inverter 300 may be a voltage source inverter (VSI) or a current source inverter (CSI). Hereinafter, for convenience of description, the inverter 300 will be regarded as a CSI.

The inverter 300 is a PWM inverter which may be driven by using a PWM method. Accordingly, an amount and a frequency of an output voltage output from the inverter 300 are controlled by using an on/off duty ratio of a control pulse signal. For example, the controlling apparatus 200 controls an output voltage output by the inverter 300 by adjusting an on/off duty ratio of a control pulse signal that turns on or off a switching device of the inverter 300. The control pulse signal is also referred to as a gating signal. The controlling apparatus 200 may use a space vector PWM method from among several PWM methods according to a voltage modulation method.

An output voltage of the inverter 300 is a three-phase voltage, and the PMSM 340 is driven by a three-phase voltage. Control of operation of the PMSM 340 is performed by using a vector control method. Accordingly, three-phase variables of the PMSM 340 indicated by a, b, and c phases may be converted to a dq-axis model, which is a rectangular coordinate system.

The current detector 320 detects a current of the PMSM 340 which is being driven and outputs the detected current to the controlling apparatus 200. The current detector 320 detects three-phase currents $i_{as}$, $i_{bs}$, and $i_{cs}$ of the PMSM 340 which is being driven. For example, the current detector 320 may be implemented by a shunt resistor or a current transformer. A current detected through the current detector 320 corresponds to the three-phase variables, and is thus output to the coordinates converting unit 240 of the controlling apparatus 200 in order to convert coordinates of the three-phase currents $i_{as}$, $i_{bs}$, and $i_{cs}$ to a dq-axis model, which is a rectangular coordinate system.

The PMSM 340 generates a magnetic flux to a rotor by using a permanent magnet, and applies a current to a stator by using the generated magnetic flux to rotate the stator, thereby generating torque that drives a load. The PMSM 340 may be an interior PMSM (IPMSM), but is not limited thereto. For convenience of description, the PMSM 340 will be referred to as an IPMSM.

The PMSM 340 is driven by an output voltage output from the inverter 300. That is, operation of the PMSM 340 is controlled based on a current detected in the PMSM 340 which is being driven, via the inverter, a speed and position of the rotor, and a command torque that is input to control driving of the PMSM 340.

The position sensor 360 detects a position $\theta_r$ of a rotor of the PMSM 340. For example, the position sensor 360 may be an encoder, a resolver, or a Hall sensor, but is not limited thereto. The position sensor 360 outputs the detected position $\theta_r$ of the rotor to the speed calculation unit 250.

FIG. 4 is a graph showing a variation in a dq-axis current of a PMSM according to a change in a DC link voltage of a PMSM. In the graph of FIG. 4, a horizontal axis denotes a d-axis current of a PMSM, and a vertical axis denotes a q-axis current of the PMSM.

The graph of FIG. 4 denotes a change in a voltage limiting circle of an inverter output voltage according to a change in a DC link voltage, a change in a speed of a rotor of a PMSM, and a change in a dq-axis of a PMSM. In FIG. 3, $V_{dc}^{norm}$ denotes a DC link voltage at the time when a speed-torque lookup table is generated, and $V_{dc}$ denotes a current DC link voltage.

When the current DC link voltage $V_{dc}$ becomes greater than a DC link voltage at the time when the speed-torque lookup table is generated, a track of a voltage limiting circle of an inverter output voltage is changed from 410 to 420, the dq-axis current of the permanent magnet synchronous current has to change while maintaining desired command torque $T_e^*$ (that may or may not be predetermined), according to an increase in a DC link voltage, and thus, the dq-axis current changes as denotes by an arrow 450 while maintaining a direction and an amount of $\Delta i_{dqs}^{r}$ according to a track 430 of desired torque (that may or may not be predetermined).

Accordingly, by normalizing a speed $\omega_r$ of a rotor of the PMSM 340 by considering a change of a DC link voltage from a DC link voltage $V_{dc}^{norm}$ at the time when a speed-torque lookup table is generated to a current DC link voltage $V_{dc}$, and using the normalized speed $\omega_{r\_mod1}$ as inputs of the speed-torque lookup table, a change in the DC link voltage may be reflected in controlling of torque of the PMSM as described above.

In addition, the controlling apparatus 200 calculates an appropriate change ratio control value via the change ratio control unit 130 according to the change in the parameters of the PMSM 340, and adjusts a change ratio of a DC link voltage as denoted by 440 of FIG. 4 based on the calculated change ratio control value. The controlling apparatus 200 calculates the normalized speed $\omega_{r\_mod2}$ of the rotor based on the adjusted change ratio of the DC link voltage, and uses the calculated, normalized speed $\omega_{r\_mod2}$ as inputs of the speed-torque lookup table to thereby reflect an error due to the change in the DC link voltage and the change in the parameters in torque control.

According to some example embodiments, by transferring a speed of a rotor that is normalized by reflecting a change in a DC link voltage and a change in parameters of a PMSM as inputs of a speed-torque lookup table, torque control may be precisely performed by considering a change in a DC link voltage and a change in parameters of the PMSM, also when performing torque control of the PMSM by using the speed-torque lookup table.

FIG. 5 is a flowchart illustrating a method of controlling torque of a PMSM by using a speed-torque lookup table, according to some example embodiments.

Referring to FIG. 5, the method illustrated in FIG. 5 includes operations that are performed in time series in the controlling apparatus 200 and the speed normalization unit 100 illustrated in FIGS. 1 through 3. Thus, it will be obvious to one of ordinary skill in the art that descriptions that are omitted below but are provided above with reference to FIGS. 1 through 3 and with respect to the speed normalization unit 100 also apply to the method illustrated in FIG. 5.

In operation 510, the speed normalization unit 100 receives a current DC link voltage of an inverter that drives a PMSM and a speed of a rotor of the PMSM.

In operation 520, the change ratio calculation unit 110 calculates a change ratio of a DC link voltage based on the current DC link voltage and a DC link voltage at the time when a speed-torque lookup table is generated.

In operation 530, the speed calculation unit 120 calculates a normalized speed of a rotor according to a change of the DC link voltage by using the speed of the rotor and the change ratio of the DC link voltage.

In operation 540, the speed normalization unit 100 transfers the normalized speed of the rotor as inputs of the speed-torque lookup table.

Accordingly, the controlling apparatus 200 that conducts torque control of the PMSM by using the speed-torque lookup table may perform precise torque control by reflecting a change in the DC link voltage by simple calculation whereby the speed input to the speed-torque lookup table according to a change in the current DC link voltage is corrected.

In addition, compared to when a magnetic flux-torque lookup table is used to reflect a change in a DC link voltage, the same performance may be achieved when the speed-torque lookup table is used, and a required calculation amount and a memory space needed for control of a PMSM may be remarkably reduced.

As described above, according to some example embodiments, in regard to torque control of the PMSM by using a speed-torque lookup table, precise torque control may be performed by reflecting a change in the DC link voltage by simple calculation whereby the speed input to the speed-torque lookup table according to a change in the current DC link voltage is corrected.

In addition, in further consideration of the change in parameters of the PMSM, by correcting a speed input to the speed-torque lookup table, precision of torque control of the PMSM may be further improved.

In addition, compared to when a magnetic flux-torque lookup table is used to reflect a change in a DC link voltage, the same performance may be achieved when the speed-torque lookup table is used, and a required calculation amount and a memory space needed for control of a PMSM may be remarkably reduced.

The computer readable code may be recorded/transferred on a medium in a variety of ways, with examples of the medium including recording media, such as magnetic storage media (e.g., read-only memory (ROM), floppy disks, hard disks, etc.) and optical recording media (e.g., compact disc (CD)-ROMs, or digital video discs (DVDs)), and transmission media such as Internet transmission media.

It should be understood that the example embodiments described herein should be considered in a descriptive sense only and not for purposes of limitation. Descriptions of features or aspects within each example embodiment should typically be considered as available for other similar features or aspects in other example embodiments.

What is claimed is:

1. A method of controlling torque of a permanent magnet synchronous motor (PMSM) by using a speed-torque lookup table, the method comprising:
   receiving a current direct-current (DC) link voltage of an inverter configured to drive the PMSM and a speed of a rotor of the PMSM;
   calculating a change ratio of a DC link voltage based on the current DC link voltage and a DC link voltage at a time when the speed-torque lookup table is generated;
   adjusting the change ratio of the DC link voltage based on a voltage limiting circle when the voltage limiting circle of an inverter output voltage becomes smaller than a command voltage of a current controller configured to control a current applied to the PMSM;
   calculating a normalized speed of the rotor by dividing the speed of the rotor by the adjusted change ratio of the DC link voltage; and
   transferring the normalized speed of the rotor as an input to the speed-torque lookup table.

2. The method of claim 1, wherein the adjusting the change ratio of the DC link voltage comprises adjusting the change ratio of the DC link voltage based on the command voltage of the current controller configured to control the current applied to the PMSM and a maximum inverter output voltage.

3. The method of claim 1, wherein that the voltage limiting circle of the inverter output voltage becomes smaller than the command voltage of the current controller results from change in parameters of the PMSM, and
   wherein the parameters of the PMSM include inductances of the PMSM and magnetic interlinkage of a permanent magnet.

4. The method of claim 1, wherein the adjusting the change ratio of the DC link voltage comprises:
   calculating a change ratio control value that limits the change ratio of the DC link voltage according to the change in the parameters of the PMSM; and adjusting the change ratio of the DC link voltage based on the calculated change ratio control value.

5. A computer readable recording medium having embodied thereon a program for executing the method of claim 1.

6. The method of claim 4, wherein the calculating the change ratio control value comprises:
receiving a command voltage of a current controller, wherein the change in the parameters of the PMSM is reflected in the command voltage;
calculating an amount of the command voltage;
calculating a maximum inverter output voltage based on the current DC link voltage;
calculating an error between the maximum inverter output voltage and the amount of the command voltage; and
calculating the change ratio control value based on the error.

7. The method of claim 6, wherein the calculating the change ratio control value comprises calculating the change ratio control value such that the error is compensated for by using a proportional integral (PI) controller.

8. The method of claim 6, further comprising:
adjusting the change ratio control value such that the change ratio of the DC link voltage is limited only when a voltage limiting circle of an inverter output voltage is smaller than the command voltage of the current controller;
wherein the adjusting the change ratio of the DC link voltage comprises adjusting the change ratio of the DC link voltage based on the adjusted change ratio control value.

9. The method of claim 6, wherein the calculating the maximum inverter output voltage comprises calculating the maximum inverter output voltage based on a maximum linear modulation range according to a space vector pulse width modulation (PWM) method of an inverter output voltage.

10. A controlling apparatus for controlling torque of a permanent magnet synchronous motor (PMSM), the controlling apparatus comprising:
a speed normalization unit configured to normalize a speed of a rotor of the PMSM, and to output the normalized speed of the rotor;
a command current obtaining unit configured to obtain a command current corresponding to the normalized speed of the rotor and a command torque by using a speed-torque lookup table;
a current controller configured to generate a command voltage based on the command current, a current detected in the PMSM, and the speed of the rotor; and
a pulse width modulation (PWM) control unit configured to determine an on/off duty ratio of a control pulse signal that controls an inverter output voltage based on the command voltage;
wherein the speed normalization unit comprises:
a change ratio calculation unit configured to calculate a change ratio of a direct-current (DC) link voltage based on an input current DC link voltage and a DC link voltage at a time when the speed-torque lookup table is generated;
a change ratio control unit configured to output a change ratio control value such that the change ratio of the DC link voltage is limited only when a voltage limit circle of the inverter output voltage becomes smaller than the command voltage; and
a speed calculation unit configured to calculate the normalized speed of the rotor, to adjust the change ratio of the DC link voltage based on the change ratio control value, and to calculate the normalized speed of the rotor by dividing the speed of the rotor by an adjusted change ratio of the DC link voltage.

11. The controlling apparatus of claim 10, wherein that the voltage limit circle of the inverter output voltage becomes smaller than the command voltage of the current controller results from change in parameters of the PMSM, and
wherein the parameters of the PMSM include inductances of the PMSM and magnetic interlinkage of a permanent magnet.

12. The controlling apparatus of claim 10, wherein the change ratio control unit further comprises:
a calculation unit configured to calculate an amount of the command voltage in which the change in parameters of the PMSM is reflected, configured to calculate a maximum inverter output voltage based on the current DC link voltage, and configured to calculate an error between the maximum inverter output voltage and the amount of the command voltage; and
a limiter configured to adjust the change ratio control value to limit the change ratio of the DC link voltage only when a voltage limiting circle of the inverter output voltage is smaller than the amount of the command voltage;
wherein the speed calculation unit is further configured to adjust the change ratio of the DC link voltage based on the adjusted change ratio control value.

13. The controlling apparatus of claim 10, wherein the controlling apparatus is configured to generate the control pulse signal by using the normalized speed of the rotor in which the change of the DC link voltage and a change in parameters of the PMSM are reflected, and
wherein the controlling apparatus is configured to output the control pulse signal to an inverter to control torque of the PMSM.

14. The controlling apparatus of claim 12, wherein the calculation unit is further configured to calculate the maximum inverter output voltage based on a maximum linear modulation range according to a space vector PWM method of the inverter output voltage.

* * * * *